United States Patent
Malboubi et al.

(10) Patent No.: US 11,405,259 B2
(45) Date of Patent: *Aug. 2, 2022

(54) CLOUD SERVICE TRANSACTION CAPSULATION

(71) Applicant: AT&T Intellectual Property I, L.P., Atlanta, GA (US)

(72) Inventors: Mehdi Malboubi, San Ramon, CA (US); Abhijeet Bhorkar, Fremont, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/995,464

(22) Filed: Aug. 17, 2020

(65) Prior Publication Data
US 2020/0382360 A1 Dec. 3, 2020

Related U.S. Application Data

(63) Continuation of application No. 16/016,388, filed on Jun. 22, 2018, now Pat. No. 10,778,503.

(51) Int. Cl.
*H04L 41/0604* (2022.01)
*H04L 9/40* (2022.01)
*H04L 41/142* (2022.01)

(52) U.S. Cl.
CPC ...... *H04L 41/0622* (2013.01); *H04L 41/0613* (2013.01); *H04L 41/142* (2013.01); *H04L 63/0853* (2013.01)

(58) Field of Classification Search
CPC ............. H04L 41/0622; H04L 41/0613; H04L 41/142; H04L 63/0853
See application file for complete search history.

(56) References Cited

U.S. PATENT DOCUMENTS

| | | | |
|---|---|---|---|
| 9,363,190 B2 | 6/2016 | Beloglazov et al. | |
| 9,734,005 B2 | 8/2017 | Ruan et al. | |
| 9,832,205 B2 | 11/2017 | Santhi et al. | |
| 2007/0005456 A1* | 1/2007 | Lei | G06Q 30/06 705/27.2 |
| 2015/0201045 A1 | 7/2015 | Komirelly et al. | |
| 2016/0198003 A1 | 7/2016 | Luft | |
| 2016/0277249 A1 | 9/2016 | Singh et al. | |
| 2017/0289060 A1 | 10/2017 | Aftab et al. | |
| 2018/0137157 A1* | 5/2018 | Gausman | G06F 16/2272 |
| 2018/0139307 A1* | 5/2018 | Gausman | G06Q 40/00 |
| 2018/0189720 A1* | 7/2018 | Henderson | G06Q 10/087 |
| 2019/0180244 A1* | 6/2019 | El Kharzazi | G06N 3/0454 |

* cited by examiner

*Primary Examiner* — Minh Chau Nguyen
(74) *Attorney, Agent, or Firm* — Guntin & Gust, PLC; Matthew Tropper

(57) ABSTRACT

A framework to handle monitoring and automatic fault manifestation in cloud networks. Multiple techniques correlate the logs of different cloud services or generate independent capsules for each component, VM, storage, or transaction. In a first exemplary technique, an authentication token is provided by an authentication service for logs during a period of an event. In a second exemplary technique, a unique instance ID for multiple distinct processes may be created in a data model of notification logs or service logs.

20 Claims, 10 Drawing Sheets

| | Keystone ID | Heat ID | Neutron ID | Nova ID | Glance ID | Cinder ID |
|---|---|---|---|---|---|---|
| Step 1 | | | | | | |
| Step 2 | ■ | | | | | |
| Step 3 | ■ | ■ | | | | |
| Step 4 | ■ | ■ | ■ | | | |
| Step 5 | ■ | ■ | ■ | ■ | | |
| Step 6 | ■ | ■ | ■ | ■ | ■ | |
| | ■ | ■ | ■ | ■ | ■ | ■ |

An example of the general structure of a unique ID, including 6 openstack services ☐ Empty Field
■ Filed w/ Value

FIG. 6

CLOUD SERVICE TRANSACTION CAPSULATION

CROSS REFERENCE TO RELATED APPLICATIONS

This application is a continuation of, and claims priority to, U.S. patent application Ser. No. 16/016,388, filed Jun. 22, 2018, entitled "Cloud Service Transaction Capsulation," the entire contents of which are hereby incorporated herein by reference.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and virtual network interfaces or virtual network interface cards (vNICs). Cloud systems are complex multi-layer hardware and software systems that consist of multiple services and components, interacting with each other through complicated mechanisms. For example, OpenStack clouds may include: 1) multiple services, such as nova, neutron, cinder, swift, glance, heat, and keystone, and 2) multiple components, such as servers, virtual machines, volumes, networks and their interfaces. The operation and management of a large-scale cloud is highly susceptible to anomalies, attacks, and faults. Identifying the root causes is often difficult to diagnose even with the skilled operators. This disclosure is directed to addressing issues in the existing technology.

SUMMARY

Obtaining a comprehensive health summary report for different cloud-related transactions or components is demanded by operators. Disclosed herein is a framework to handle monitoring and automatic fault manifestation in cloud networks (e.g., OpenStack networks) that not only may reduce the complexity and the cost of anomaly detection, attack detection, root cause analysis, or health monitoring, but also improve the accuracy and reliability of identifying such tasks.

In an example, there may be a computer-implemented method for the correlation and encapsulation of relevant logs, messages, or events that traverse different services or components in cloud environments. In another example, there may be a computer-implemented method for creating and enforcing a unique ID for each transaction, or operation that traverse multiple services in a cloud environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 6 illustrates an exemplary structure of a unique ID for a VM and the process of generating a unique ID.

DETAILED DESCRIPTION

Notification logs and cloud-service logs are widely available in OpenStack clouds with distributed services or components. These logs are rich sources of information that may be used for a variety of applications such as network monitoring, resource monitoring/allocation, anomaly detection, and root-cause analysis. Conventionally, accurate correlation between OpenStack or the like cloud computing logs from different services is difficult and many of the possible solutions are computationally expensive and non-scalable and generate in-accurate and noisy capsules (e.g., a group of correlated or otherwise relevant logs) with unrelated messages or missed messages (e.g., logs). These shortfalls of the conventional system may be due to the following: 1) the lack of the existence of a global ID in the logs; 2) pre-defined/standard IDs (e.g., instance_id, image_id, subnet_id, network_id, etc.) are populated in the messages (e.g., logs) of different services; or 3) the use of redundant IDs makes searching for messages with same attributes computationally expensive and not scalable when cloud networks increase in size.

Disclosed herein are the following techniques: 1) the use of an authentication token provided by an authentication service (e.g., Keystone on OpenStack) along with a multi-layer log or data processing scheme, and 2) enforcing a unique instance ID in the data model of logs (e.g., notification or service logs) of cloud systems (e.g., OpenStack clouds). As disclosed in more detail herein, the presence of a unique ID among logs for each VM and for different transactions may significantly enhance the precision of the correlation process and facilitate this process. Such a unique ID may identify all the logs of the VM and it may be used for different cloud monitoring applications. Using the disclosed techniques may allow for tracing-back or dynamically tracking the correlated logs and encapsulate them for VM, volume, different transactions, or other components of the cloud.

Figure 1:
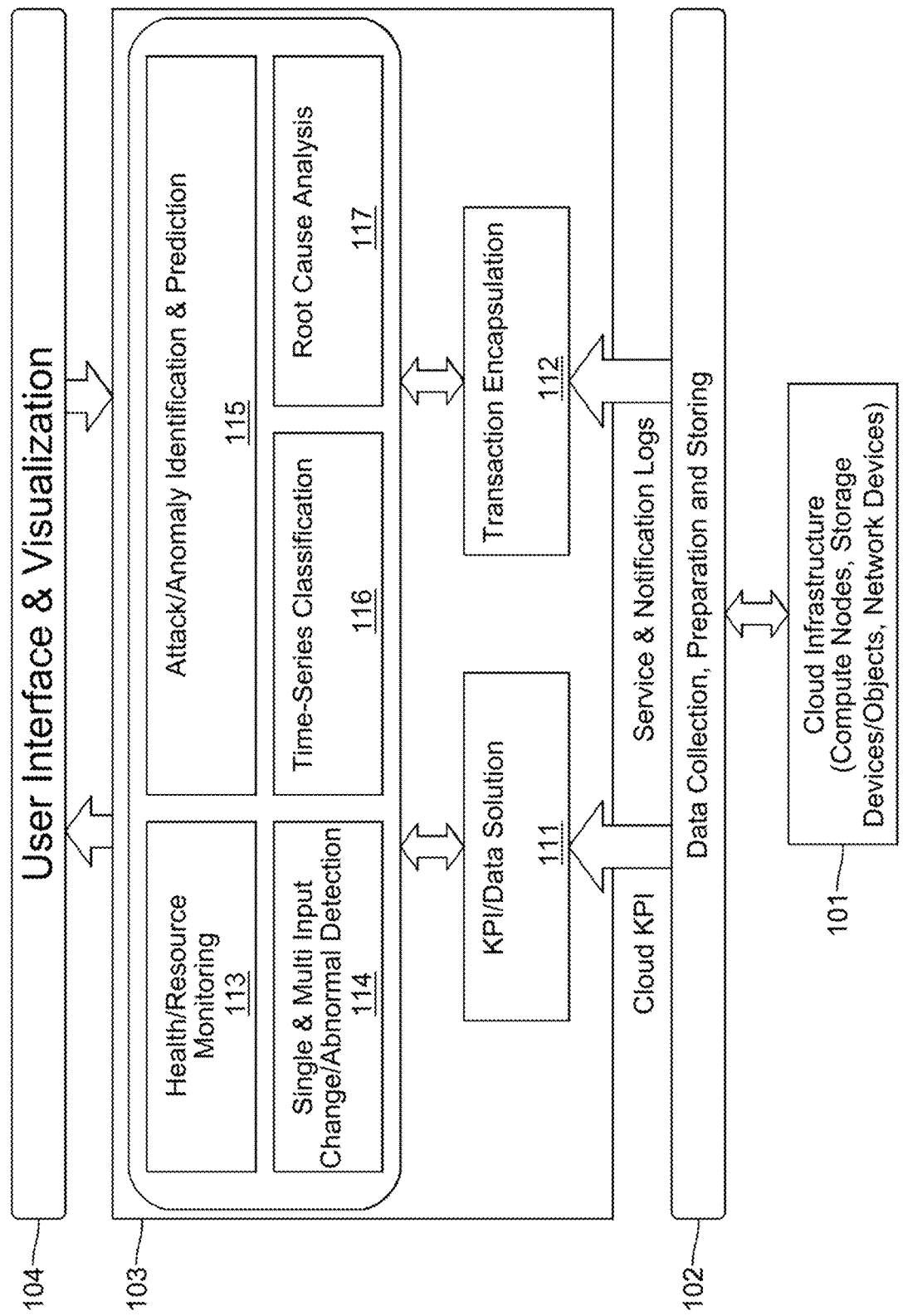
FIG. 1 illustrates an exemplary architectural block diagram for a framework for root cause analysis and anomaly detection (CAScADE) for cloud networks.

FIG. 1 illustrates an exemplary architectural block diagram for a framework for root cause analysis or anomaly detection (CAScADE) for cloud networks. There may be a cloud infrastructure 101 that may include computer nodes, storage devices, storage object, or network devices, among other things. At block 102, measurement agents may be distributed among hosts and other devices (e.g., switches or routers) in the cloud infrastructure 101. Data may be collected by measurement agents in the cloud infrastructure 101 for pre-processing and storing. Pre-processing may include extracting required fields from the logs, flattening nested logs, removing incorrect or duplicate logs, At block 103, there may be an analytics engine 103 that provides various analytics services (e.g., as disclosed in block 113 and block 114) that may eventually be provided through a user interface at block 104.

With continued reference to FIG. 1, at block 112, there may be transaction encapsulation. Transaction encapsulator at block 112 may process notifications (e.g., logs) from different sources, such as open source message broker (e.g., RabbitMQ) notifications and OpenStack service logs (e.g., nova-API logs or the like cloud computing, mostly deployed as infrastructure-as-a-service). At block 112, notification messages (e.g., notification logs) may be accessed that directly appear on the message broker bus or are stored in a storage or database system. Accordingly, the transaction encapsulator at block 112 may identify a set of most correlated notification logs and determine the set of most relevant auxiliary KPI that is useful for the analysis. Various analytic services may be applied on these set of logs and KPIs. This block 112 is similar to transaction encapsulator 132 disclosed herein.

At block 116, time-series analysis may be applied on the selected KPIs of block 111 to detect the stationarity and periodicity of the key performance indicators (KPIs) time-series. Such analysis may indicate the presence of specific patterns in the data. For example classify the KPIs into stationary, not-stationary or periodic time series which can be used to classify if data is generated via human interaction or machine interaction. At block 114, a change detection or abnormal detection module may use a single or multiple of the selected KPIs and apply supervised or unsupervised learning algorithms to detect the deviation from normal patterns. For example, if the KPIs is greater than a threshold (e.g. mean+2*sigma(KPI)) then it can indicate an anomaly. Or if anomaly is detected by applying principle component analysis on the KPIs. At block 117, root cause analysis may be applied onto capsules of correlated logs that are the sequence of events for each transaction. For example, the transition delays between events may be computed. High transition delays (e.g., higher than (mean+2*sigma(transition delays))) may indicate significant occurrences of potential anomalies and may be reported to identify the main root causes. In addition, significant information (e.g., error messages) may be extracted from the corresponding notifications or logs and a summary of the logs for each event may be provided for an operator. Moreover, the total transition time between OpenStack services may be computed and represented in the service delay transition matrix. This matrix may identify the components that cause high delays. In a first example, if the nova-to-nova has a high delay, it may indicate issues in allocating compute resources, such as insufficient resources at the host. In a second example, if there is a high delay between nova and neutron, then port creation or port assignment may be the main root cause of the anomaly. Accordingly, an expert system may use machine learning or machine intelligence techniques (e.g. deep learning techniques) that utilizes the information generated from capsules such as the sequence of events and transition delays, service delay transition matrix, state transition diagram, virtual machine (VM)-parameters (e.g., vCPUs, disk-size, or memory), auxiliary information, or KPIs from other sources (e.g., network KPIs). This system may provide the following: 1) classify the root cause(s) of an anomaly, 2) predict the root cause(s) of an anomaly, 3) compute an anomaly score to identify un-healthy transactions, 4) compute an anomaly score to identify failed transactions, or 5) adaptively use the feedback provided by the operator to improve its accuracy. Classify may mean determine the possible root cause(s). Predict may mean determine based on the information obtained the past (e.g., a particular pattern) what the root cause may be in future. Unhealthy may mean transactions that include errors that reach a high threshold in their logs, have high delay, or the like which causes performance problems. Anomaly score may be a numerical value of the health of a transaction.

At block 113, health or resource monitoring may be used to compute the utilization of resources along with their health conditions. This information may provide insights about the underlying infrastructure and it may be used in different analysis inside CAScADE or outside of this framework. At block 115 there may be incident (e.g., attack or anomaly) identification or prediction. For example, at block 115, after detecting the presence of an incident, further information about the incident may be identified (e.g., the type of the incident or the type of compromised hosts, which may be VMs). In addition, the presence of an incident may be predicted by incorporating information from multiple sources or applying machine learning techniques (e.g. time series analysis or recurrent neural networks). With regard to incorporating information from multiple sources, systems may use data (e.g., KPIs) from other sources, such as network KPIs from other data stores (e.g. Contrail KPIs) or other orchestration services such as master service orchestrator (MSO) or open network automation platform (ONAP).

Figure 2:
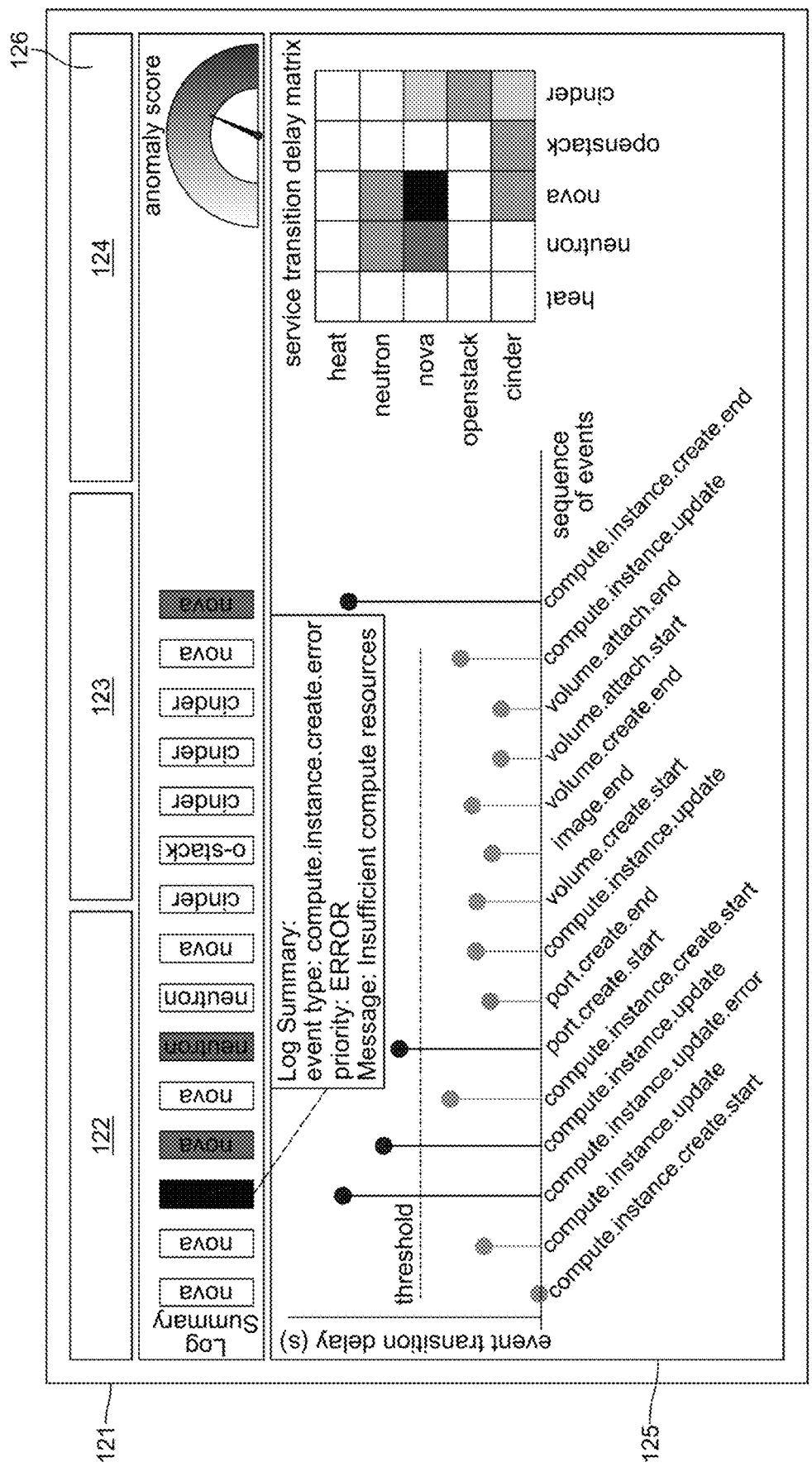
FIG. 2 illustrates an exemplary graphical user interface (GUI) for visualizing the details of a VM-creation transaction.

At block 104, a user interface (e.g., visualization module) may be used. For example, at block 104, access to the services inside the CAScADE may be provided or the results of the analysis visualized. FIG. 2 illustrates an example graphical user interface (GUI) 121 for visualizing the details of a VM-creation transaction. GUI 121 at block 122 and block 123 shows what may be considered significant information extracted from notification messages of different OpenStack services. In addition, block 125 of GUI 121 shows the sequence of events and transition delays in this transaction. Moreover, GUI 121 indicates a possible root cause at block 124 and asks for the operator feedback at block 126.

Disclosed herein are multiple techniques for correlating the logs of different cloud services or generating independent capsules for each service, component, VM, storage, or transaction. In a first exemplary technique, an authentication token provided by the authentication service (e.g., Keystone on OpenStack) may be used. In a second exemplary technique, a unique instance ID may be enforced in the data model of notification logs or service logs of OpenStack clouds. Service logs are from OpenStack services such as nova-api log, cinder-api log. But, notification logs refers to logs from RabbitMQ which is a component of OpenStack. The aforementioned techniques may be used to trace-back or dynamically track the correlated logs and encapsulate them for VM, volume, transaction, or other components of the cloud. Note that volume as referred herein is cloud volume (e.g., virtual storage or software defined storage), which is similar to a hard-disk-based volume except that the underlying data is stored in the cloud, most likely in an object storage system.

A transaction in OpenStack may include a series of subtasks that involves communicating among different services. A successful transaction may include the start sub-task and end sub-task from the originator service. Each sub-task may include multiple events. On the other hand, in case of the unsuccessful transaction, the transaction may have an error message before the transaction is declared unsuccessful. The techniques below provide details of the encapsulating of transactions (e.g., sub-tasks), associated with each VM, volume, or other components, using logs.

Figure 3:
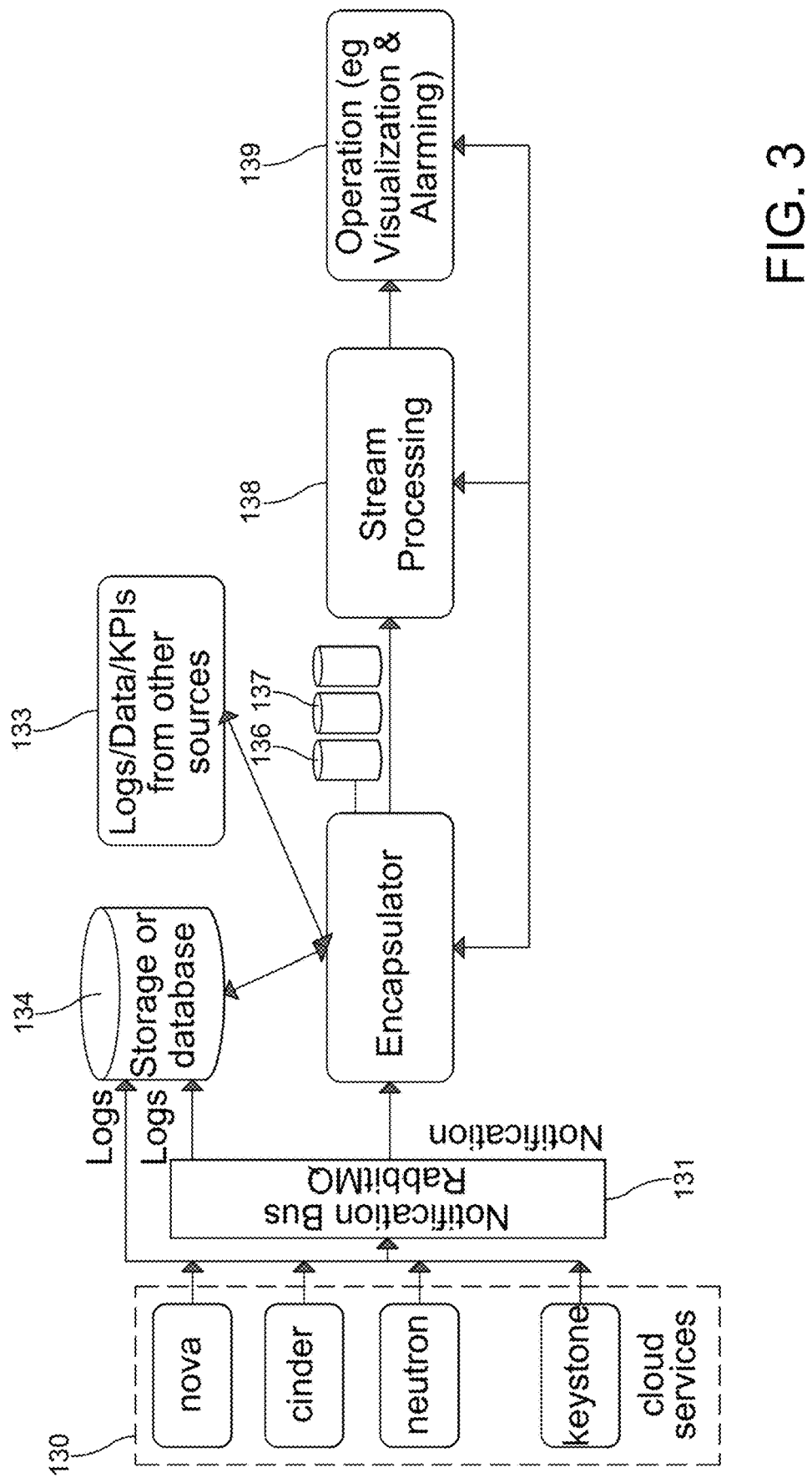
FIG. 3 illustrates an exemplary OpenStack transaction capsulation system.

FIG. 3 illustrates an exemplary OpenStack transaction capsulation system. In FIG. 3, encapsulator 132 operates on the inputs received from cloud services 130 (e.g., OpenStack serrvices—nova, cinder, etc.). Cloud services 130 may communicate logs to a centralized logging entity, such as notification bus 131 (e.g., RabbitMQ) or to storage database 134. Encapsulator 132 may also receive additional information from other sources 133, such as host agents running on servers in the cloud. Encapsulator 132 may then deliver the capsules of correlated (or otherwise associated) messages (occurring for the same transaction or component), such as capsule 136 or capsule 137) into storage database 134 or streamed to a stream processing platform 138. Stream processing 138 may include cloud monitoring operations such as anomaly detection or root cause analysis. Various applications (e.g., cloud monitoring operations), such as anomaly detection and cloud health monitoring, receive the correlated messages and the results may be presented using a graphical interface via operation block 139.

As shown in FIG. 3, transaction encapsulator 132 uses notification logs from different OpenStack services to provide capsules of correlated logs for each transaction. Transaction encapsulator 132 uses a layered approach to correlate the logs and generate different capsules (e.g., capsule 136 or capsule 137) for each transaction, VM, or other components. Each capsule may be defined as a sequence of correlated logs (e.g., notifications) that may traverse different OpenStack cloud services and are between a start event and an end event. Based on the definition of the transaction (e.g., VM-creation or VM-deletion), transaction encapsulator 132 may apply a combination or series of filters (in parallel or sequentially) to correlate logs and encapsulate a group of correlated messages. Each filter may have specific input(s) and output(s). In one example, a filter may process and capture part(s) of the logs that are relevant to each transaction, service, or component. For example, a filter may use the instance_id of a VM to capture all the logs where the value of instance_id filed (e.g., key) is yy (yy being some alpha or numeric value). In another example, a filter, may also be a specific request to access and retrieve specific information from a storage. In another example, a filter may be a specific query, request or call to a database for retrieving particular information or measurement stored in the database. As another example, a filter may use the data in a storage or database.

Figure 4:
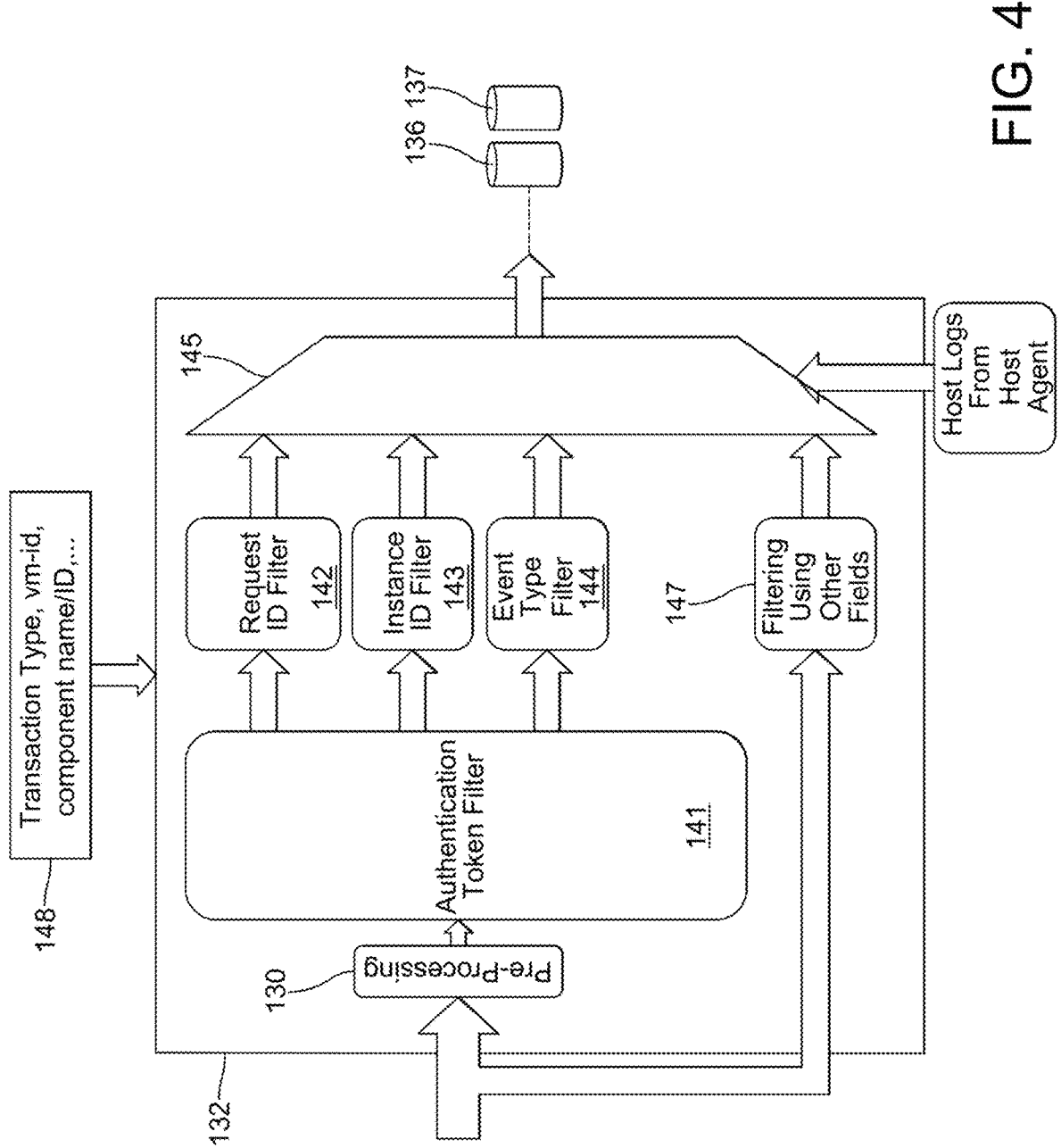
FIG. 4 illustrates an exemplary series of filters applied for creating capsules.

FIG. 4 illustrates an exemplary combination of filters. There may be pre-processing 140 before the filters. Pre-processing 140 may include extracting required fields from the logs, flattening nested logs, removing incorrect or duplicate logs, The filters, as shown in encapsulator 132 of FIG. 4, may include authentication token filter 141, request ID filter 142, instance ID filter 143, event type filter 144, or other filtering 147 that may be applied in series or in parallel for creating capsules, such as capsule 136 or capsule 137. Block 148 may be inputs that define the transaction type or VM of interest that should be tracked by transaction encapsulator 132. Authentication token filter 141 is based on an authentication token and it identifies the list of request-id(s) of logs that are traversed among different services. Request ID filter 142 is based on the request ID. Logs that have the same token with the request ID in the list of request IDs and are between the start event and end events may be grouped into one capsule (e.g., capsule 136). In addition, logs from other sources such as host logs 146, which may be from the host agent (e.g. measurement agents running on the servers in data centers), may be correlated with the logs using host-name info from the logs. Also, other correlated notifications may be identified by applying additional filters using other fields, such as other filtering 147, as indicated in FIG. 4. For example, networking logs from neutron may be further correlated with the logs based on the port/device id or IP-addresses. Encapsulator 132 may also apply appropriate pre-processing 140 and post-processing 145; for example, it may remove expired logs or duplicated logs. Moreover, independent capsules may be stored in a database and the independent capsules may be used for further analysis and visualizations (FIG. 3). Each capsule may also include correlated messages over a pre-defined duration. A transaction without the completion event during this interval may be considered a failed transaction. Note that logs from other sources (e.g. host logs 146 form host agents) may be incorporated in the correlation mechanism. The host agents may be distributed among all or a set of hosts in the cloud. Transaction encapsulator 132 of FIG. 4 may use the authentication token provided by the authentication service (e.g., Keystone on OpenStack) to identify different logs of different services in OpenStack clouds. It is understood that this observation may be significant and is transferable to other systems (e.g., other than OpenStack) because services interact with an authentication and authorization service such as Keystone (or the like service) and use the authentication token in communication corresponding messages.

Accordingly, when a capsule 136 is defined with specific start events and end events over a particular time interval, the authentication token of the start event or end event is captured (e.g., from "_context_auth_token" in conventional logs). This token may be used to identify all logs traversing different services with different request IDs. Hence, a request ID list may be obtained including the request IDs of messages with the same token from different services. Then, all messages (e.g., logs) that have the same token with the request ID in the request ID list (e.g., "request_id_list") and are between the start events and end events may be captured in one capsule (e.g., capsule 136). This process may be used in an offline manner by tracing-back the stored logs or in an online manner by observing the start event and end events on notification bus 131. Note that without loss of generality, the same token may be used in different ways to extract different messages and encapsulate different OpenStack transactions.

Based on the transaction in use, other correlated logs may be identified using other fields or the combination of other fields in the logs of services (e.g., nova) or components (e.g., VM, network-element, or node). For example, port device ID (e.g., "port_device_id") from neutron with the same instance ID (e.g., "instance_id") may be grouped into the capsule of VM creation transaction. As another example, service or component logs without token (e.g. Keystone logs or OpenStack logs) may be identified with the filed event type (e.g., "event_type") and they may be grouped into the corresponding capsules. For example, for VM creation transaction, logs with "event_type=image.send," having the same "user_id" and "tenant_id" that are between the start of a VM creation and end of a VM creation, may be grouped into the capsule of VM creation (e.g., capsule 136).

This technique may be used to encapsulate logs over the lifecycle of a VM, a volume, or other components. These logs may be sorted in time and a time-series of logs may be produced which may be used for different cloud monitoring applications. For example, the behavior of a VM or volume may be modeled and the future events may be predicted using machine learning techniques, such as recurrent neural networks. In addition, the same technique may be used to capture and track related messages in other cloud components such as an orchestration service. Moreover, based on the definition of the transaction, additional logs and messages may be added to each capsule. For example, if it is network creation transaction, logs from other sources (e.g. Contrail) can be added.

Figure 5:
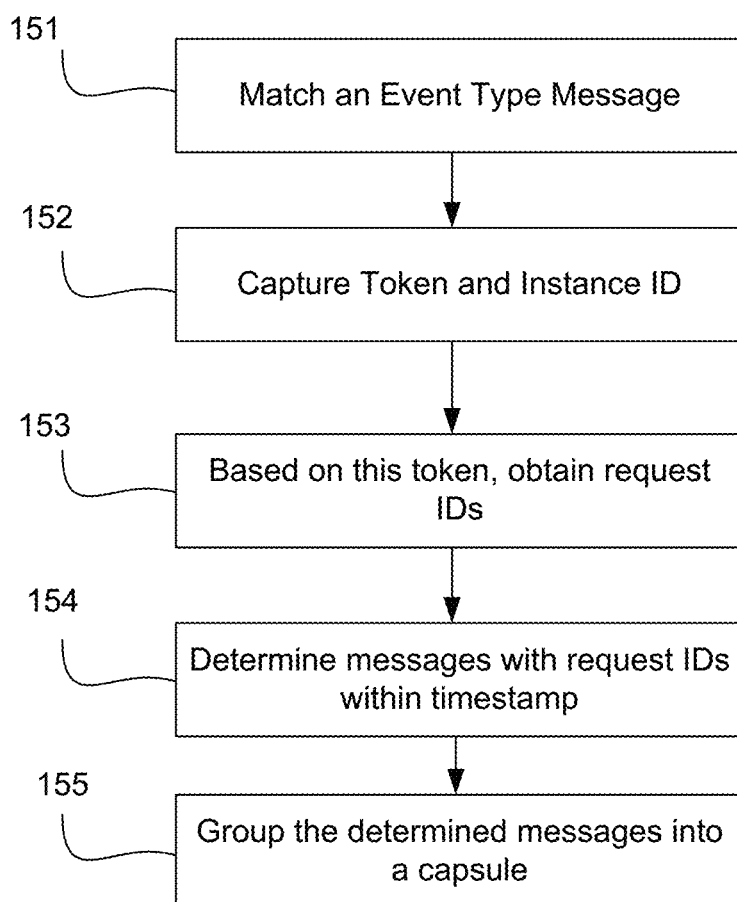
FIG. 5 illustrates an exemplary method for creating capsules.

FIG. 5 illustrates an exemplary method for generating a VM creation capsule. At step 151, content of an event type message may be matched based on a particular criteria that may be predetermined. For example, the criteria may be that a message includes "event_type"="compute.create.instant.end". At step 152, the token and instance_id, such as "_context_auth_token" and "instance_id" fields of the message of step 151 may be obtained. At step 153, the token of step 152 may be used to obtain the "request_id" of all messages with the same token from different OpenStack services and form a list of request_ids. For example, messages with the request_id in the list of request_ids. At step 154, messages with request IDs within a time period may be determined (e.g., using the timestamp field in logs). At step 155, the determined messages may be grouped into a capsule. For example, messages between the time stamps of messages with "event_type"="compute.create.instant.start" and "event_type"="compute.create.instant.end" may be grouped in one capsule, called the Capsule of VM Creation transaction for VM with specific instance_id (e.g., capsule 136). In addition, logs with the same "instance_id" that are between start events and end events may be added to the Capsule of VM Creation transaction (this includes logs from neutron with "port_device_id"="instance_id"). Also, messages with the "event_type" equals to "image.send" (with the same user_id, tenant_id, and project_id) that are between start event and end events may be added to the Capsule of VM Creation transaction. If required, such a VM creation may be divided into multiple sub-capsules using other fields (e.g. instance_id field).

FIG. 6 illustrates an example method for generating a unique ID for different transactions, services, or components in cloud environments (e.g. OpenStack clouds). In this method, a unique ID of length N bits (e.g., N=128 bits) is considered for events related to the life-cycle of a transaction, service, or component. A unique ID of length N bits may be partitioned into multiple parts (with equal or unequal number of bits), for example, one part for each service of the cloud management system. For example, in OpenSatck clouds, the unique ID may include the following parts: keystone ID 161, heat ID 162, neutron ID 163, nova ID 164, glance ID 165, or cinder ID 166. Each part may be called a sub-id which is a unique ID.

Consider an example of VM creation. As the VM creation is proceed, this unique ID (e.g., unique-id) is crawling among different OpenStack services. Each service sequentially inserts its own unique sub-id into its predefined location and sends back the unique-id to the previous services. At any time, each service uses the most completed unique-id. In this way, the unique-id is formed as the concatenation of IDs from different OpenStack or the like cloud services as it is shown in the following example.

Unique ID=concat(unique sub-ID of keystone, unique sub-ID of heat, unique sub-ID of neutron, unique sub-ID of nova, unique sub-ID of glance, unique sub-ID of cinder).

With continued reference to FIG. 6, the unique ID is initially empty. Note that, if a service is not visited during a completion of an action, its sub-id remains empty. Also, a service does not change its own field if it already has a sub-id. Compared with current techniques where different IDs are repeatedly populated in preferably every message, if such a unique ID is generated for each message, all redundant IDs may be removed from the messages. This may reduce the communication overhead, traffic on the notification bus, or storage capacity requirement in cloud networks. In cloud networks, there may be different components that communicate with each other and a large volume of logs may be generated and appear on the notification bus and stored in storage devices. This may be particularly important for cloud services in which local and distributed control planes interact. Thus, using a unique ID in messages and without redundant IDs, the cost and the overhead of interacting services, the traffic on the notification bus (note that the capacity of notification bus may be a bottle neck in some cloud services) and required storage capacity are significantly reduced.

Again, FIG. 6 illustrates the general structure of the unique-id and how it may be completed over time. The number of bits for sub-ids of different services may vary based on the practical constraints/limitations. In this example, at step 171, a process is started from keystone. A VM may be created with a keystone, in which the keystone generates a random sub-id (e.g., of length 20 bits) and places it in the first field (e.g., keystone ID field 161) of the unique ID. This is called keystone-id 161 and may be populated in all notification logs generated for this user. Next, at step 172, in the first interaction of keystone with heat for creating the VM, heat may generate a random number (e.g. of length 28 bits), and place it in the second field (e.g., heat ID field of 162) of the unique ID. This may be called heat-id 162. Heat populates this unique ID that may include keystone-id 161 and heat-id 162 in all notification logs. Heat also sends back the unique-id (containing keystone-id 161 and heat-id 162) to keystone and keystone may use this most updated unique-id in future logs. This general process may be repeated through the following steps (step 173-step 176) for all OpenStack services until a VM is created and its attached to its network and volume. At that time, a VM has a unique-id of length N-bits. This unique ID may be populated in all the logs of a VM and it can be used for tracing-back previous events and to follow-up future events. Note that by using this technique to create a unique-id, the behavior of transactions may also be determined. For example, failed transactions may be more easily determined as transactions with un-completed global ID.

The disclosed framework provides data driven approaches to handle monitoring and automatic fault manifestation in OpenStack clouds that may reduce the complexity and the cost of anomaly/attack detection, root cause analysis, or health monitoring. The disclosed framework may also improve the accuracy and reliability of anomaly/attack detection, root cause analysis, or health monitoring, among other things. The CAScADE framework, is a fine-grained event correlation and analysis framework for anomaly/attack detection, root cause analysis and health/resource monitoring in OpenStack clouds with the capability of extracting near real-time insightful information.

The second technique generates a unique ID for each transaction without repeating redundant IDs. Accordingly, it may significantly reduce the communication overhead, the required storage capacity, or the traffic on the notification bus. Note that, the capacity of the notification bus may be one of the major bottle-necks for a cloud service.

Overall, the disclosed techniques may provide an efficient encapsulation mechanism where the sequence of related messages of VMs, volumes, transactions, or components in OpenStack clouds may be identified and grouped into independent capsules. Accordingly a variety of applications may be implemented using these capsules, including 1) causality analysis, 2) anomaly detection, or 3) prediction.

With reference to causality analysis (e.g., root cause analysis) for cloud services, logs of different components of the OpenStack can be correlated. As one example, the failure of nova services (e.g., a first component) may be correlated with issues in neutron services (e.g., a second component) more precisely.

With reference to anomaly detection, modeling of the sequence of different Openstack's actions may be used for identifying and predicting anomalous sequence of events, root cause analysis, or determining malicious attacks. For anomaly detection, the delay between the sequences of events may be computed and the service(s) which are the root cause for having large delays may be identified. For example if there is a large delay (e.g., mean+2*variance (transition delays)) between "image.send" and "compute.instance.update", then there may be a problem for transmitting the image. As another example, any deviation from the correct sequence of events (for each action), may identify an anomaly. Another possible example where the sequence of events and inter-arrival latencies along with sequence of actions may be used for modeling the behavior of different users on VNFs. With regard to prediction, there may be prediction of future events or prediction of latencies of the completion of future events for a given transaction.

As disclosed herein attack may be considered as one type of anomaly and attack may cause an anomaly. Usually anomalies are considered as deviation from the correct performance in data networks, while attacks are important anomalies from a security perspective. Root cause analysis is the process of finding the main reasons(s) of having an anomaly. Health monitoring is the process of measuring the performance indicators of a system. Precision is a measure that determines how close the results are to true values. Reliability shows how consistent such results are.

With reference to nova, it provides a way to provision compute instances (aka virtual servers). Neutron provides networking as a service between interface devices (e.g., vNICs) managed by other Openstack services (e.g., nova). Cinder is a Block Storage service for OpenStack. It's designed to present storage resources to end users that can be consumed by the OpenStack Compute Project (Nova). This is done through the use of either a reference implementation (LVM) or plugin drivers for other storage. Keystone provides a central directory of users mapped to the OpenStack services they can access. It acts as a common authentication system across the cloud operating system and can integrate with existing backend directory services like LDAP.

The information below provides additional perspective for the subject matter disclosed herein. Cloud computing may be defined as the delivery of computing services (servers, storage, databases, networking, software, analytics, and more—over the Internet). There are different software platforms for cloud management and orchestration of clouds. The software platforms may include interrelated components or services that control diverse, multi-vendor hardware pools of processing, storage, or networking resources throughout a data center.

OpenStack is a free and open-source software platform for cloud computing, mostly deployed as infrastructure-as-a-service, whereby virtual servers and other resources are made available to customers. OpenStack has a modular architecture with various code names for its components. The main services of Openstack clouds are: 1) OpenStack compute (Nova) is a cloud computing fabric controller that is designed to manage and automate pools of computer resources and can work with widely available virtualization technologies; 2) OpenStack Networking (Neutron) is a system for managing networks and IP addresses; 3) OpenStack Block Storage (Cinder) provides persistent block-level storage devices for use with OpenStack compute instances; 4) OpenStack Identity (Keystone) provides a central directory of users mapped to the OpenStack services they can access; 5) OpenStack Image (Glance) provides discovery, registration, and delivery services for disk and server images; 6) OpenStack Object Storage (Swift) is a scalable redundant storage system; 7) OpenStack Dashboard (Horizon) provides administrators and users with a graphical interface to access, provision, and automate deployment of cloud-based resources. OpenStack clouds uses RabbitMQ to coordinate operations and status information among services. Each service or component generates a log file that records an event, an activity, a message, or information and the log file is stored in a key-value data structure format. In Openstack clouds, each Openstack service may generate its own logs. In addition, RabbitMQ logs (e.g., notification logs) may be collected.

A transaction may be considered a sequence of operations that different services of cloud must perform for completing a task such as creating or allocating some resources. Cloud provides a capability for creating multi-tenant environments consisting of multiple independent components, such as VMs, volumes, or networks.

Figure 7:
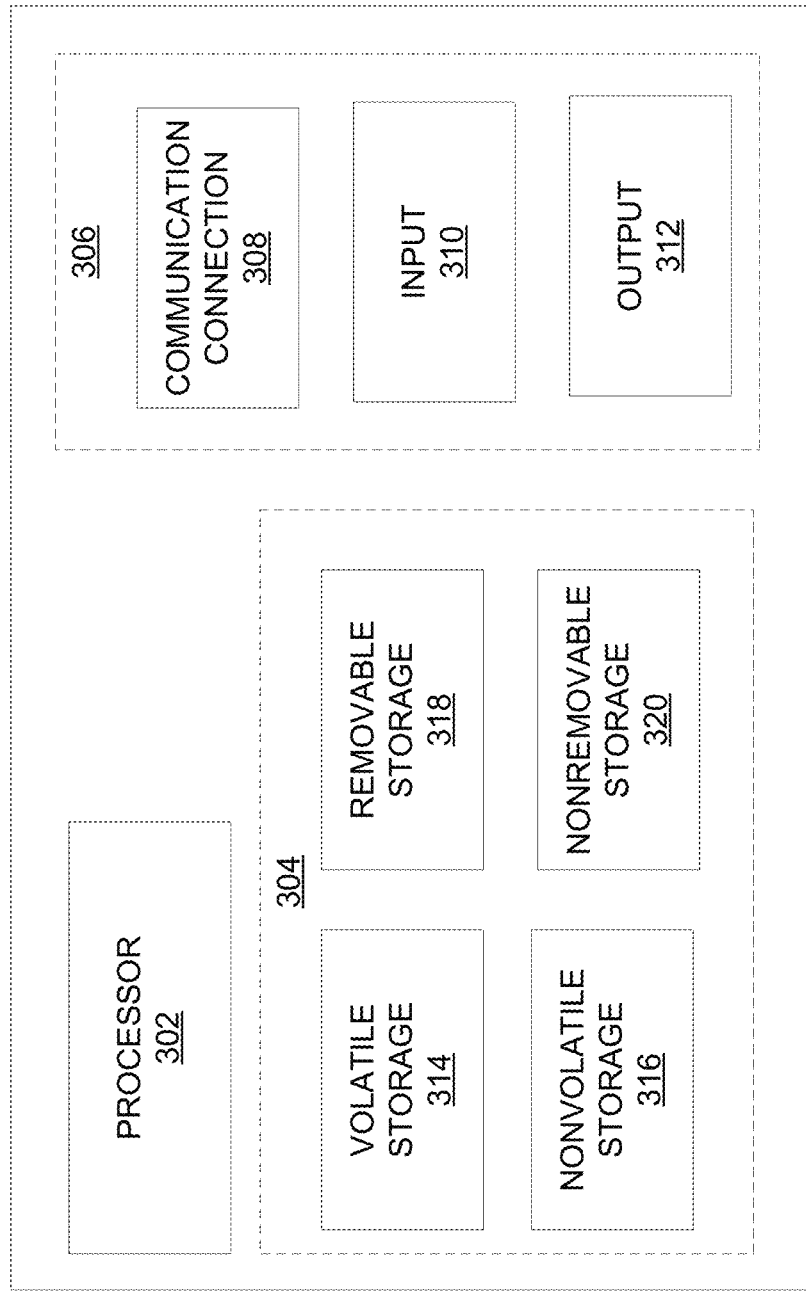
FIG. 7 illustrates a schematic of an exemplary network device.

FIG. 7 is a block diagram of network device 300 that may be connected to or comprise a component of FIG. 1 (e.g., devices of block 101). Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
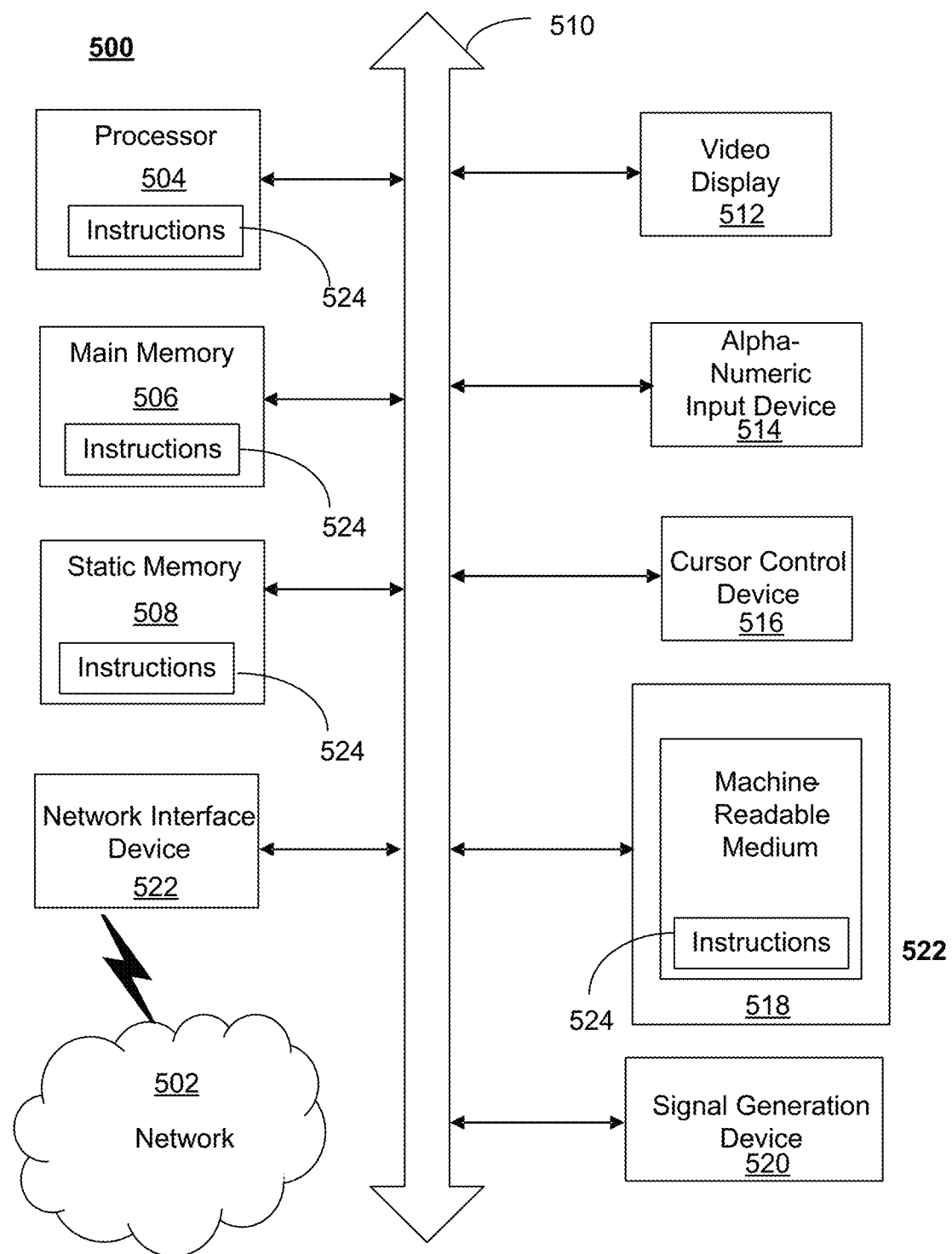
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, devices of block 101 (e.g., compute nodes, storage devices, network devices) and other devices of FIG. 1 and FIG. 9a. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9A:
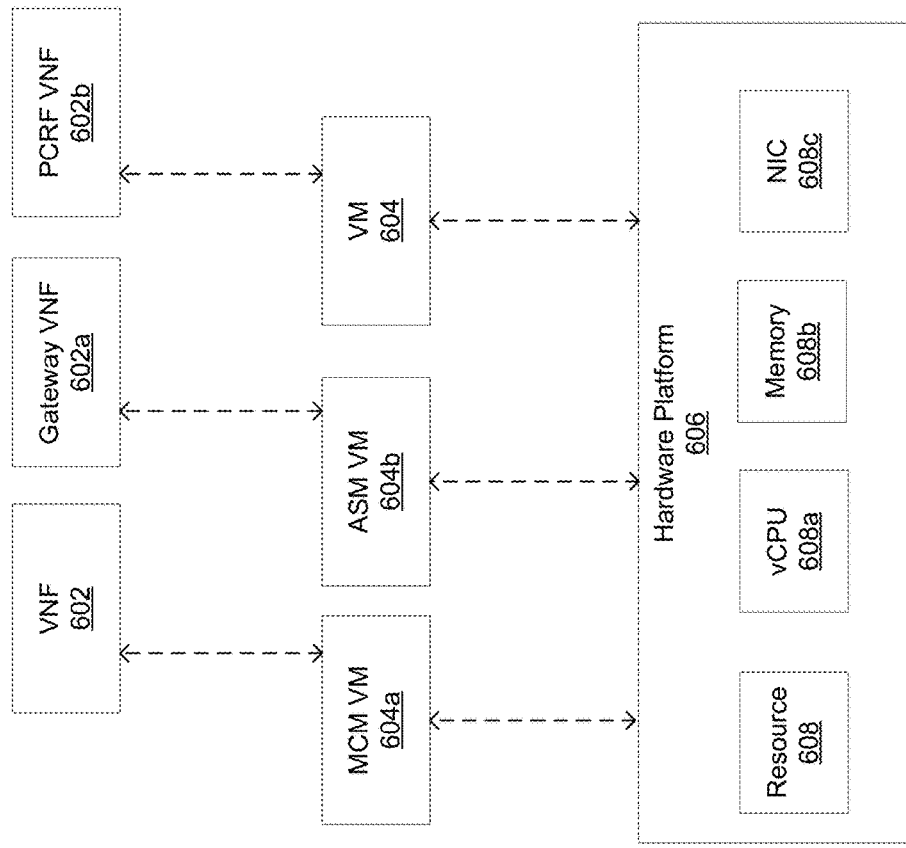
FIG. 9a is a representation of an exemplary network.

FIG. 9a is a representation of an exemplary network 600. Network 600 (e.g., cloud network of block 101 of FIG. !) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 9a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 9B:
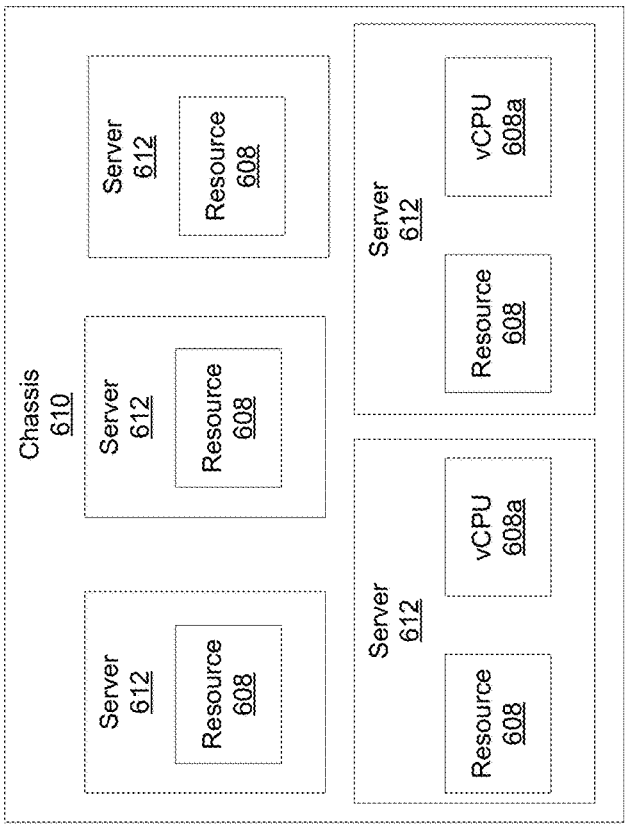
FIG. 9b is a representation of an exemplary hardware platform for a network.
Figure 9B:
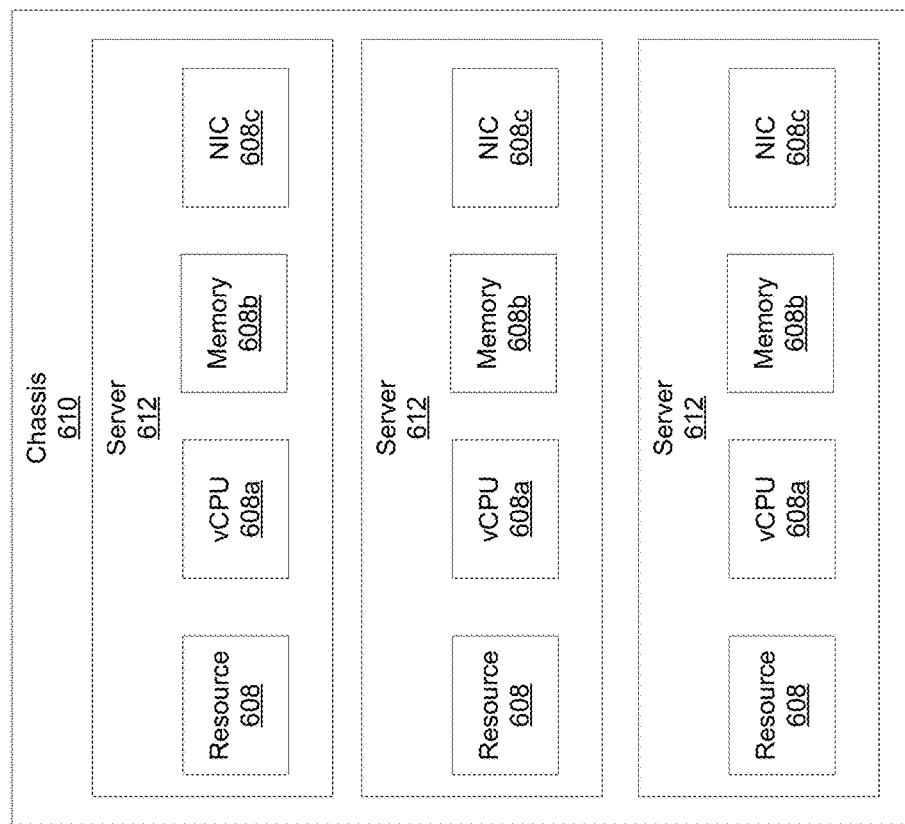

While FIG. 9a illustrates resources 608 as collectively contained in hardware platform 606, the configuration of hardware platform 606 may isolate, for example, certain memory 608c from other memory 608c. FIG. 9b provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 9b illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have sufficient resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration— three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)— would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life— especially for simple M2M devices—through enhanced wireless management.

While examples of a telecommunications system in which cloud service transaction capsulation may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—cloud service transaction capsulation—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

A method, apparatus, or computer-readable storage medium for a cloud service transaction may include obtaining an event type; matching the event type to a first criteria; based on the matching of the event type to a first criteria, obtaining an authentication token associated with the event type; appending the authentication token as a request ID for each transaction associated with the event type; based on the authentication token, obtaining a list of request IDs that are within a period, wherein the period is between a period of receiving a start event transaction for the event type and end event transaction for the event type; grouping the list of request IDs into a capsule; and determining an anomaly based on analysis of the capsule. The method, apparatus, or computer-readable storage medium may further include determining health of a virtual machine processing the event type based on an analysis of the capsule. The grouping of the logs into the capsule may be based on generating a unique ID, the unique ID may include multiple parts where each part may be generated by a cloud service that observes the unique ID for the first time, and then may filter logs with the same unique ID. The grouping of the logs into the capsule may be based on filtering the logs with the same unique ID wherein the unique ID comprises of multiple parts in which each part of the multiple parts are generated by a cloud service that observes the unique ID for the first time. All combinations in this paragraph (including the removal or addition of steps) are contemplated in a manner that is consistent with the other portions of the detailed description.

A method, apparatus, or computer-readable storage medium for a cloud service transaction encapsulation may include obtaining a request for an event type, wherein the event type may be creation of a virtual machine; providing instructions to execute the event type, wherein the executing the event type may be based on the use of multiple distinct processes during a period; executing a first process of the multiple distinct processes for the event type; based on executing the first process, generating a first random number for the first process, wherein the first random number may be a first sub-identifier for the period for which the event type is being executed, wherein the period may be between a period of receiving a start event transaction for the event type and end event transaction for the event type; executing a second process of the multiple distinct processes for the event type; based on executing the second process, generating a second random number for the second process, wherein the second random number may be a second sub-identifier for the period for which the event type is being executed; merging the first sub-identifier with the second sub-identifier to create a unique identifier; providing instructions to the second process to communicate the unique identifier to the first process; providing instructions to the second process and the first process to use the unique identifier for the period of the event type when creating a log; and determining an anomaly based on analysis of the log. The multiple distinct process may be cloud service processes, such as keystone, nova, neutron, or the like in any cloud service. The merging may be based on concatenation of sub-identifiers. The log may be a service log or notification log. The operations may include grouping of the logs into the capsule based on filtering the logs with the same unique ID wherein the unique ID includes multiple parts in which each part of the multiple parts are generated by a cloud service that observes the unique ID for the first time. All combinations in this paragraph (including the removal or addition of steps) are contemplated in a manner that is consistent with the other portions of the detailed description.

There may be a computer-implemented method for creating or enforcing a unique ID for each transaction, or operation that traverse multiple services in a cloud environment. The method may include considering a unique ID of length N bits and dividing it into multiple parts of length K bits, for each cloud service; and based on receiving the ID, each service fills its parts and send it back to the previous services. The method may be of an iterative nature. The K may be different for each service. All combinations in this paragraph (including the removal or addition of steps) are contemplated in a manner that is consistent with the other portions of the detailed description.

There may be a computer-implemented method for defining a transaction or component based on an identifier; based on the definition, obtaining a token, key or ID from the authentication and authorization service in the cloud; applying a combination of filters and pre/post processing, in sequence or in parallel, to group relevant logs into correlated logs (e.g., capsules); storing capsules; and apply analysis on capsules or a set of capsules for predicting as disclosed herein. The filters may process or capture part(s) of the logs that are relevant to at least one transaction or component. The filters may be requests, queries, or calls for collecting or retrieving particular information or measurements from storages or databases. The transaction or component definition may be determined by using information from the logs. The inputs of the encapsulator may be any number of inputs as disclosed herein. The capsules of correlated logs and measurements may be used by different analysis modules for anomaly detection or the like as disclosed herein (e.g., block 139). All combinations in this paragraph (including the removal or addition of steps) are contemplated in a manner that is consistent with the other portions of the detailed description.

What is claimed:

1. A method comprising:
   receiving, by a server, an event type;
   matching, by the server, the event type to a first criteria;
   based on the matching of the event type to the first criteria, obtaining, by the server, an authentication token associated with the event type;
   based on the authentication token, identifying, by the server, logs captured during a time interval; and
   grouping, by the server, the logs into a capsule.

2. The method of claim 1, wherein the time interval is between a period of receiving a start event transaction for the event type and an end event transaction for the event type.

3. The method of claim 1, wherein the time interval is defined as a variable period.

4. The method of claim 1, wherein the grouping of the logs into the capsule is based on applying a combination of filters.

5. The method of claim 1, wherein the grouping of the logs into the capsule is based on applying a combination of filters, wherein the filters are in parallel.

6. The method of claim 1, wherein the grouping of the logs into the capsule is based on applying a combination of filters, wherein the filters are in series and in parallel.

7. The method of claim 1, further comprising determining an anomaly based on an analysis of the capsule.

8. The method of claim 1, wherein the grouping of the logs into the capsule is based on generating a unique ID, the unique ID comprises multiple parts in which each part of the multiple parts are generated by a cloud service that observes the unique ID for a first time, and filtering logs with the same unique ID.

9. A system comprising:
one or more processors; and
a memory coupled with the one or more processors, the memory storing executable instructions that when executed by the one or more processors, cause the one or more processors to effectuate operations comprising:
receiving an event type;
matching the event type to a first criteria;
based on the matching of the event type to the first criteria, obtaining an authentication token associated with the event type;
based on the authentication token, identifying logs captured during a time interval; and
grouping the logs into a capsule.

10. The system of claim 9, wherein the grouping of the logs into the capsule is based on applying a combination of filters.

11. The system of claim 9, wherein the grouping of the logs into the capsule is based on generating a unique ID, the unique ID comprises multiple parts in which each part of the multiple parts are generated by a cloud service that observes the unique ID for a first time, and filtering logs with the same unique ID.

12. The system of claim 9, wherein the grouping of the logs into the capsule is based on applying a combination of filters, wherein the filters are in parallel.

13. The system of claim 9, wherein the grouping of the logs into the capsule is based on applying a combination of filters, wherein the filters are in series and in parallel.

14. The system of claim 9, further comprising determining an anomaly based on an analysis of the capsule.

15. A non-transitory computer-readable storage medium storing computer executable instructions that when executed by a computing device cause the computing device to effectuate operations comprising:
receiving an event type;
matching the event type to a first criteria;
based on the matching of the event type to the first criteria, obtaining an authentication token associated with the event type;
based on the authentication token, identifying logs captured during a time interval; and
grouping the logs into a capsule.

16. The non-transitory computer-readable storage medium of claim of 15, wherein the grouping of the logs into the capsule is based on applying a combination of filters.

17. The non-transitory computer-readable storage medium of claim of 15, wherein the grouping of the logs into the capsule is based on applying a combination of filters, wherein the filters are in series.

18. The non-transitory computer-readable storage medium of claim of 15, wherein the grouping of the logs into the capsule is based on applying a combination of filters, wherein the filters are in parallel.

19. The non-transitory computer-readable storage medium of claim of 15, the operations further comprising determining an anomaly based on an analysis of the capsule.

20. The non-transitory computer-readable storage medium of claim of 15, wherein the grouping of the logs into the capsule is based on generating a unique ID, the unique ID comprises multiple parts in which each part of the multiple parts are generated by a cloud service that observes the unique ID for a first time, and filtering logs with the same unique ID.

* * * * *